United States Patent Office 2,904,438
Patented Sept. 15, 1959

2,904,438

CHOCOLATE PRODUCT AND PROCESS

John J. O'Rourke, River Forest, Ill., assignor to Mars, Incorporated, Chicago, Ill., a corporation of Delaware No Drawing. Application April 9, 1956
Serial No. 576,805

13 Claims. (Cl. 99—24)

The present invention relates to heat resistant chocolate products and to the process for preparing the same.

Solidified chocolate, such as commonly used for coating and other chocolate products, when subjected to temperatures above the melting point of the cocoa butter or other fat constituents, as in hot whether or in the tropics, tends to lose its desired character and shape, to become soft and unsatisfactory to handle, to exude its fat constituents at the surface, and to become sticky so that if wrapped, it sticks to the wrapper and its surface is marred when the wrapper is removed. These effects are particularly objectionable in chocolate coated confections, inasmuch as the chocolate coating constitutes an outer layer on an edible center and any tendency of the chocolate coating to flow or to adhere to the wrapper often results in an exposure of the center, not only rendering the confection unsightly, but also destroying its original identity as a chocolate coated confection.

In processing ordinary chocolate, it is conventional to grind a mixture of chocolate liquor and sugar to the desired degree of fineness using ordinary roll refiners and, thereafter, to incorporate the desired amount of cocoa butter. Milk solids may also be added, preferably prior to grinding. The chocolate mixture and cocoa butter is then placed in a conge, melangeur, or other suitable device capable of agitating or working the mixture and of providing aeration so that certain undesired aromas will be allowed to escape. Because of such working or continued agitation which usually involves further grinding, the sugar and skim milk solids become completely coated with fat. This last step is commonly referred to as "finishing" and is necessary to the development of the finished chocolate flavor. The resulting mixture or "paste" is then tempered and either formed into a finished product or cast in the form of relatively large cakes which are stored for subsequent use or shipped to a confectioner for use in preparing solid or coated chocolate confections.

According to the usual commercial practice in making chocolate coatings, the large cakes as above described are prepared for casting into small bars or for the enrobing operation by remelting. After casting or enrobing, the chocolate sets to the solid state when cooled until the fat is crystallized, but reverts to its original soft, fluid condition when subsequently subjected to a temperature above the melting point of the fat.

In the production of heat resistant or shape-sustaining chocolate products, it has been proposed, in order to cope with the problem described above, to rely upon processing methods which provide for a reduced amount of working so as to leave a certain proportion of the surfaces of the sugar and skim milk particles naked of any fat film, the fat being melted and distributed only over sufficient of the particle surfaces to produce the degree of fluidity necessary for the operation which is to be performed. When such a mixture first sets, the mass becomes interspersed with a plurality of bonds between the contiguous bare faces of sugar particles, which bonds are formed through reaction with the moisture in the mass. This causes heavy internal friction so that the mass resists deformation even though the fat subsequently becomes melted at high temperatures. Thus, molded chocolate bars have been made which will remain set at summer or tropical temperatures. When subjected to these temperatures, some oiling off may take place, but the internal friction caused by the bonds between contiguous bare faces of the sugar particles is great enough to prevent the surface of the bar from being carried away when the wrapper is moved.

The disadvantages in the above described product reside in the fact that it does not have, as described hereinafter, a "finished" chocolate flavor and, more over, such product can not satisfactorily be used for the purpose of enrobing edible centers or otherwise. When a chocolate composition is to be used for enrobing, it must be more fluid than one intended for the preparation of solid bar confections as by extrusion into a mold. The plasticity of the mixture is directly proportional to the extent to which the particle surfaces of the ingredients other than fat are coated by melted fat. Consequently, when the mixing is carried to the point at which there will be sufficient fat coated particles to provide the necessary plasticity for the enrobing operation, there will not be enough fat-free surfaces left to build up internal friction when the fat is subsequently melted, and thereby to sustain the coating.

In order to provide sufficient fluidity to enable a chocolate product of the above type to be handled satisfactorily in an enrobing operation, it has been proopsed to create a condition of temporary fluidity by the addition of a small amount of water to the basic composition before mixing, say, of the order of 2–3%. When this product is ground on conventional roll refiners, as in the above-described process, some of this water is lost by evaporation, but sufficient remains to preserve a wet surface on some of the non-fat solid particles. Then, when this product is subsequently worked to break it down to paste consistency, the force of working creates unstable fat films on the surfaces of the water-wet particles, giving a temporary fluidity which lasts long enough to permit the desired enrobing with the chocolate. Because of the moisture beneath some of the fat films, however, the films break down subsequent to the enrobing operation, resulting in a "set" product which resists flow due to the bonds which are formed between the contiguous bare faces of the non-fat particles.

Although the improvement described above gives the necessary fluidity for enrobing candy centers and casting chocolate materials into bars, there are several attendant disadvantages. First, as in the preceding process, there has been no preparation of a finished flavor. In the case of finished chocolate products, the separate flavors of the ingredients are combined and certain undesirable aromas are removed as a result of the extended agitation and working. As a result, the consumer perceives only one flavor and not the separate flavors of the various ingredients, such as the cocoa beans, skim milk, sugar, etc. On the other hand, with the shape-sustaining chocolate products prepared in accordance with the two aforedescribed processes, it is impossible to provide a "finished" flavor since, in order to provide sufficient fat-free surfaces so that the product will retain its shape at temperatures above the melting point of the fat, the various ingredients cannot be mixed for a length of time sufficient to combine the flavors of the various ingredients and to remove the undesirable aromas. A second disadvantage of these two processes resides in the limited amount of fat that can be obtained in such a product, the amount of fat or cocoa butter being less than 35%. If this fat content is exceeded the described heat resistance is lost. A third disadvantage of the last described process is that in order to obtain the desired fluidity it is necessary to subject the chocolate material to special processing steps in the confectioner's plant. In using regular chocolate which has no heat resistant properties, the confectioner is simply required to melt the chocolate block supplied for coating purposes by raising the temperature of the same to 92°–110° F. However, in the case of the shape-sustaining chocolate containing the added 2–3% water, it is necessary that the confectioner employ special equipment or apparatus such as a melangeur in order to work the materials to a sufficient extent to obtain the desired fluidity. However, although the fluidity is suitable for both molding and enrobing purposes, it is far from satisfactory and, once the chocolate material has been worked to a condition of temporary fluidity, it must be used immediately and not allowed to solidify. If it is not so used but allowed to solidify, the shape-sustaining properties will be lost upon subsequent reworking to provide the necessary fluidity.

A further improvement to the above-described processes has been to treat the heat resistant chocolate products after enrobing, casting or other final forming to prevent "oiling off" of the fat at the surface of the product when exposed to temperatures above the melting point of the fat. In such treatment moisture is applied to the surface of the heat resistant chocolate product while the chocolate coating or cast product is still in the hot plastic state. This results in some of the sugar in the mix dissolving in the moisture to form a sugar syrup film on the surface so that upon drying and cooling the film is solidified into a thin skin of crystalline sugar. This sugar skin effectively keeps the wrapper from contacting the underlying chocolate mass, and being derived from the coating itself the crystalline structure of the inner surface of this skin extends into the surface of the coating and interlocks closely with the microscopically rough surface of the bonds between the contiguous bare faces of the sugar particles. The firm interlocked relation of the sugar skin to the surface of the coating prevents the sugar skin from chipping off or becoming detached. Moreover, while some of the fat may melt under the skin, and some of it reach the surface, by exuding between crystalline interfaces of the sugar skin structure, the texture of the skin is such that the solid particles which cause stickiness are held back and do not reach the surface so that the coating does not adhere to the wrapper, with the result that there is no damage to the surface of the product when the wrapper is removed.

While the above-described process is effective in preventing oiling off resulting in the adherence of the coating to the wrapper, it provides insufficient shape retaining characteristics. Consequently, in order to provide a heat resistant product which will retain its shape or set at temperatures above the melting point of the fat, chocolate mixtures prepared according to the aforedescribed processes in which there are fat-free surfaces must be used in order to provide a chocolate product which is acceptable during the heat of the summer or at all times in the tropics. However, as evident from the foregoing, all of such chocolate products as will retain their shape or set at elevated temperatures have been unacceptable in that they do not have a "finished" chocolate flavor, cannot be used for enrobing edible centers, or require the use of special equipment by the confectioner and cannot be reworked after having once been allowed to set. It is easily seen, therefore, that the provision for an edible chocolate product which will not lose its set when exposed to temperatures above the melting point of the fat and which is free from the aforedescribed disadvantages is highly desirable.

It is an object of the present invention to provide edible chocolate products having the characteristic "finished" chocolate flavor and capable of retaining their shape and character at elevated temperatures.

Another object of the invention is to provide chocolate goods which can be used by the confectioner in the preparation of heat resistant chocolate and chocolate coated products without requiring the use of special processing equipment.

A further object of the invention is to provide chocolate goods which can be softened or melted in the conventional way and formed into chocolate and chocolate coated products capable of retaining their shape and character at elevated temperatures.

Still further objects of the present invention will become apparent from the description that follows hereinafter.

It has now been found that a heat resistant chocolate having a completely blended or "finished" chocolate flavor can be produced by incorporating a compatible humectant and protein such as casein and albumen present in milk solids into the chocolate in the source of its manufacture, protecting the chocolate from moisture absorption at least during grinding on roll refiners, and preferably until final shaping of the chocolate and then exposing said final shaped chocolate product to a humid atmosphere so that moisture is absorbed by the chocolate composition causing the formation of a structure which renders the chocolate product self-sustaining at temperatures above the melting point of cocoa butter.

The protein may be added in any manner but is conveniently incorporated by adding milk solids. The milk solids suitably are present in from 2% by weight to 20% by weight of the composition on the basis of skim milk solids.

The pertinent part of the invention is the protection of the chocolate-protein composition against premature moisture absorption. This can be done by maintaining the composition during processing and until final shaping of the chocolate in an atmosphere having a relative humidity of not more than 45%. However, while this is preferable, and insures good heat resistance, it has been found that the principal humidity control should take place during the grinding of the composition on the refiner rollers at which point in the processing the material is spread out in film form.

The following table shows the effect of controlling the humidity in the surrounding atmosphere at the refiner on the heat resistance of chocolate coatings which were exposed to an atmosphere of a relative humidity of 88% at 84° F., maintained for 22 hours.

*Table 1*

| Humidity at refiner, percent | 22 hrs. at 84° F. (dry), 81° F. (wet) |
|---|---|
| 26 | 9½ |
| 33 | 8½ |
| 44 | 8½ |
| 45 | 9 |
| 53 | 6 |
| 60 | 5 |
| 63 | 7½ |
| 76 | 4 |
| 85 | 5 |
| 92 | 5½ |

In the above table the figures given in column two are ratings of heat resistance based on the military specifications for candy and chocolate confections, as follows:

"From Military Specifications for Candy & Chocolate Confections MIL-C-10928 Quartermaster Corps, Feb. 12, 1951—'The coating shall be such that when the wrapped coated bars are held at 100° F. for 2 hours, the wrapper can be easily removed from the bar or disc without adherence.' "

In the table, however, there is used an arbitrary scale wherein there is assigned ratings for heat resistance on the basis of zero for no resistance, 5 for poor resistance, 7 for fair, 8 for satisfactory, and 10 for perfect. It is seen from the above table that satisfactory heat resistance for the chocolate coating is not obtained until the humidity at the refiner is 45% or below.

The maintenance of humidity control during other stages of the process such as during blending or during working in the conge is of lesser importance than the humidity control during the refining operation since in those other operations the chocolate composition is in bulk form whereby the moisture is not readily absorbed. It would not ordinarily be absorbed to a sufficient extent during the processing to give unsatisfactory heat resistance to the coatings of the final product. Nevertheless improved results are obtained by maintaining humidity control at all stages of the process.

The prevention of moisture absorption during storage and shipment, i.e., from the time the chocolate is manufactured until the time when it is molded into a chocolate bar, used in the enrobing of centers or otherwise put in its final commercial form is of importance but is not essential. If the chocolate is cast into the usual 10-pound cake, which is the size generally used by chocolate manufacturers in supplying confectioners, the chocolate containing the humectant should be wrapped or otherwise packaged in a suitable moisture-proof packaging material to prevent the absorption of moisture by the chocolate. On the other hand, an equally suitable method is to transfer the chocolate immediately after manufacture to a tank in which the material may be transported to the confectioner's plant, the tank being virtually filled with the liquid chocolate and thereby minimizing to the utmost the opportunity for moisture absorption.

After the chocolate has been used in the fabrication of the final product to be sold to the consumer the goods are then exposed to humidity conditions such as to bring about moisture absorption by the non-fat milk solids which results in creating a structure such as that described above which makes the solid chocolate piece or chocolate coating heat resistant. Exposure of the final shaped chocolate product to humidity conditions such as 50-70% R.H. provides sufficient moisture absorption within a period of 2-4 weeks to create the desired structure. This, of course, can take place during normal distribution of the finished confection through commercial channels so that a finished, heat resistant chocolate product is secured with virtually a minimum of additional expense from the standpoint of additional materials and/or labor costs.

However, in order ot insure that the customer obtains satisfactory heat resistance regardless of when he first receives the products or the type of humidity conditions to which it has been exposed prior to receipt by him, it has been found advisable to expose the shaped chocolate product to controlled humidity conditions prior to shipment to the customer. Preferably in order to accomplish the results in a minimum period of time the product is exposed to an atmosphere having a relative humidity above 80%, as for example 88%, and at a temperature below the melting point of the coating, such as 84° F.

Typical humectants for use in the present invention are corn syrup solids, glucose syrup solids, the various sugars such as dextrose, maltose, invert sugar, levulose, (fructose), xylose, amorphous sucrose, and the like, and other materials such as mannitol, propylene glycol, glycerine, sorbitol and the like.

Pure anhydrous dextrose is not as good a humectant as dry corn syrup solids. Such latter material having a "dextrose equivalent" of 24% or 42% is eminently satisfactory, probably because of the presence of other materials such as dextrines. It may be that the humectant properties of such dry corn sugar is the result of the combined action of the dextrines and the dextrose or that such dextrines in preventing the crystallization of the dextrose keep it in an amorphous form in which it has the best moisture absorbing property. This latter would seem to be the case since crystalline sucrose is not as good a humectant for the purposes of the present invention as spray dried sucrose which is non-crystalline or amorphous and is a very effective humectant. Spray dried malt extract which, of course, is high in maltose, is also a suitable humectant.

Invert sugar, generally considered as a 50-50 mixture of dextrose and levulose, is also a very effective humectant although the level at which it can be used is somewhat limited when it is used as a syrup. It then must be "plated" on the sucrose to be incorporated into the chocolate but cannot be used to such an extent as to cause the solution of an appreciable amount of the sucrose, the upper limit being about 10% by weight of the sucrose which generally corresponds to about 5% by weight of the chocolate. Amounts of below 0.3% are ineffective for practical humidification.

Generally, any suitable level of humectant may be incorporated into the chocolate, greater amounts resulting in proportionately increased moisture absorption and to a degree increased heat resistant in the chocolate. With a commercial dry corn sugar such as "Frodex" and with dried malt extract the material is employed at a level of about 5% by weight of the chocolate. Sorbitol, on the other hand, being a more effective humectant is employed at a level of 2-3%. Taste considerations are also involved, especially in the cases of dried malt extract and propylene glycol, for example.

A typical example employing the process of the present invention follows:

Example 1

A mixture of the following is mixed together and ground on an ordinary refiner of the type used in the chocolate industry for the purpose of reducing the particle size:

| | Lbs. |
|---|---|
| Chocolate liquor | 10 |
| Whole milk solids | 18 |
| Sucrose | 42½ |
| Cocoa butter | 10 |
| Corn syrup solids | 4½ |
| Dextrose equivalent | 24 |

Thereafter an additional 15 lbs. of cocoa butter is added to the ground material and worked until substantially all of the solid particles are encased in melted fat. This working is carried out in a conge at a temperature of 124° F. for 24 hours. The refining and congeing operations are carried out in an atmosphere having a relative humidity of 35% at 20° C.

The specification for typical milk chocolate is as follows:

| | Percent |
|---|---|
| Total fat | 33-34 |
| Sucrose | 38.7-39.6 |
| Corn syrup solids | 4.3-4.4 |
| Milk solids | 21-22 |
| Chocolate liquor | 14 |
| 1 oz. vanilla beans per 500# chocolate. | |
| Moisture | Less than 1 |

The chocolate is tempered and may be used in conventional enrobing or depositing machines to coat candy centers or prepare candy bars, respectively. On the other hand, it may be cast into a large block, e.g., a 10-pound block, which can be shipped to a confectioner for the purpose of enrobing candy centers or molding solid chocolate bars. Upon arrival at the confectioner's plant it is employed for either of these purposes by being melted at a temperature of 90°-100° F. and after final shaping, it is solidified by cooling, tempered and the final product packaged and otherwise handled in the usual manner.

The following is an example of a chocolate product containing invert sugar as a humectant.

Example 2

A 100 pound batch of sweetened milk chocolate is produced by placing 44½ lbs. of sucrose in a melangeur heated to 120° F. and coating the sugar with 2½ lbs. of invert sugar syrup (75% invert sugar, 25% water). The operation of the melangeur is continued 10 minutes until the invert syrup is thoroughly coated on the sucrose. The coated sucrose is then combined with 10 lbs. of chocolate liquor, 18 lbs. of whole milk solid and 10 lbs. of cocoa butter, mixed together and ground on a roll refiner for about 5 seconds for the purpose of reducing the particle size. The room temperature during the refining is 85° F. and the relative humidity is 30%. Thereafter, an additional 15 lbs. of cocoa butter is added to the ground material and the entire amount is worked in a conge at 124° F. for 24 hours until substantially all of the solid particles are encased in melted fat. The humidity of the atmosphere during this operation is also preferably maintained at below 45% relative humidity.

The chocolate is tempered and may be used in conventional enrobing or depositing machines to coat candy centers or prepare candy bars, respectively. On the other hand, it may be cast into a large block, e.g., a 10-lb. block, which can be shipped to a confectioner for the purpose of enrobing candy centers or moulding solid chocolate bars. Upon arrival at the confectioner's plant it is employed for either of these purposes by being melted at a temperature of 90–100° F. and after final shaping, it is solidified by cooling, tempered and the final product packaged and otherwise handled in the usual manner.

It is from this point on, of course, that the desired action of the humectant takes place. Moisture-proof packaging materials, of course are not employed since this would defeat the purpose of employing the humectant. Generally, after the chocolate products containing a humectant have been subjected to average humidity conditions for a period of 2 to 4 weeks in the course of normal distribution, it is found that sufficient moisture absorption has occurred to create the structure giving rise to the desired heat resistance. Fortunately, during the hotter part of the year humidities are relatively high thereby lessening the period required for moisture absorption and the creation of the desired structure. On the other hand, especially where the chocolate products are designed to be sold in relatively hot, dry areas, it may be desirable to store the chocolate products under conditions of high humidity for a week or two to make sure that the desired structure obtains.

It is to be understood that the scope of the invention is not intended to be limited to the specific procedures, proportions of ingredients, and other particulars which have been set forth above, which have been given by way of illustrating the principle of the invention. For a definition of the scope of the invention, reference is made to the appended claims.

What is claimed is:

1. In the process of making chocolate wherein a composition comprising chocolate, milk solid protein, sucrose, and a humectant is mixed and ground by means of rollers whereby the mixed composition containing the humectant is present on the rollers in a thin layer which normally absorbs moisture during the rolling operation, the improvement which consists in carrying out the rolling operation in an atmosphere in which the relative humidity is controlled at not more than approximately 45%.

2. The process of claim 1 in which the humectant includes dextrose.

3. In the process of making a heat resistant milk chocolate product which comprises mixing and grinding by means of rollers a composition comprising chocolate, milk solid protein, sucrose, and a humectant whereby the composition containing the humectant is present on the rollers in a thin layer which normally absorbs moisture during the rolling operation, congeing the composition, and forming the conged composition into shape; the improvement which consists in maintaining a controlled humidity of the contacting atmosphere during the rolling operation at below 45 percent relative humidity, and then, after the forming step, maintaining a controlled humidity of the contacting atmosphere on the shaped product at above 50 percent relative humidity at a temperature below the melting point of the composition for a period of time sufficient to render the chocolate self-sustaining at temperatures above the melting point of cocoa butter.

4. The process of claim 3, wherein the relative humidity after the forming step is above 80 percent and the temperature is above normal room temperature.

5. The process of claim 3 wherein the humectant is corn syrup solids.

6. The process of claim 3 wherein the humectant is spray dried amorphous sucrose.

7. The process of claim 3 wherein the humectant is invert sugar.

8. The process of claim 3 wherein the humectant is sorbitol.

9. A heat resistant milk chocolate product obtained by the process of claim 3.

10. A heat resistant milk chocolate product obtained by the process of claim 5.

11. A heat resistant milk chocolate product obtained by the process of claim 6.

12. A heat resistant milk chocolate product obtained by the process of claim 7.

13. A heat resistant milk chocolate product obtained by the process of claim 8.

References Cited in the file of this patent

UNITED STATES PATENTS

| | | |
|---|---|---|
| 2,311,235 | Kuderman | Feb. 16, 1943 |
| 2,328,791 | Drury | Sept. 7, 1943 |
| 2,348,473 | Hollstein | May 9, 1944 |
| 2,520,807 | Marco | Aug. 29, 1950 |
| 2,673,802 | Hansen | Mar. 30, 1954 |